United States Patent [19]

Nakamura et al.

[11] Patent Number: 5,153,743
[45] Date of Patent: Oct. 6, 1992

[54] VIDEO SIGNAL RECORDING AND REPRODUCING APPARATUS HAVING A BUILT-IN VIDEO CAMERA

[75] Inventors: Kenji Nakamura; Eiji Tamura, both of Kanagawa, Japan

[73] Assignee: Sony Corporation, Tokyo, Japan

[21] Appl. No.: 574,095

[22] Filed: Aug. 29, 1990

[30] Foreign Application Priority Data

Aug. 29, 1989 [JP] Japan .................................. 1-220462

[51] Int. Cl.[5] .............................................. H04N 9/87
[52] U.S. Cl. .................................................... 358/334
[58] Field of Search ............... 358/310, 311, 319, 320, 358/324, 326, 334, 185

[56] References Cited

U.S. PATENT DOCUMENTS 3,812,523  5/1974  Narahara ............................ 358/328
4,467,368  8/1984  Horstmann ......................... 358/334
4,553,175  11/1985  Baumeister ........................ 358/334
4,613,909  9/1986  Tobe ................................... 358/310
4,764,812  8/1988  Hamley .............................. 358/320

Primary Examiner—Donald McElheny, Jr.
Attorney, Agent, or Firm—Lewis H. Eslinger; Jay H. Maioli

[57] ABSTRACT

Only one encoder for encoding color difference signals B-Y and R-Y into a carrier chrominance signal is required in a video camera combined in one unit with a video signal recording and reproducing apparatus. In both a recording and a reproducing mode, a composite video signal is provided as an output signal for monitoring, even though the color video signal is processed in the component manner by the apparatus. A synchronizing signal is selectively applied to the encoder either from a reference signal generator or from a reproduced synchronizing signal in the recording mode or the reproducing mode, respectively, so that only one encoder is sufficient to perform both recording and playback.

12 Claims, 4 Drawing Sheets

VIDEO SIGNAL RECORDING AND REPRODUCING APPARATUS HAVING A BUILT-IN VIDEO CAMERA

BACKGROUND OF THE INVENTION

1. Field of the Invention

The present invention relates generally to video signal recording and reproducing apparatus and, more particularly, to a video tape recorder having a built-in video camera.

2. Description of the Background

A device in which a video camera and a video signal recording and/or reproducing apparatus are combined in one body is known. To arrange and connect the various elements of the video tape recorder having a built-in camera, various techniques have been proposed, one of which is disclosed in Japanese Patent Laid-Open Gazette No. 54-86304, for example.

FIG. 1 shows a general circuit arrangement of such a combined camera and video tape recorder (VTR), which is mainly comprised of a camera section, shown within a one-dot chain line A, and a video signal recording apparatus section, shown within a one-dot chain line B.

As shown in FIG. 1, there is provided a camera circuit system or camera block 1, in which a signal derived from a charge-coupled device (CCD) imager element or an image pickup tube is amplified and processed in a predetermined signal processing manner to provide a luminance signal (Y) and color difference signals (R-Y) and (B-Y), which are sometimes referred to as I, Q signals.

A synchronizing signal generator circuit 2 uses a reference clock signal from a crystal oscillator 3 to generate a horizontal drive signal HD, a vertical drive signal VD, a color subcarrier signal of frequency fsc, a sampling clock signal having a frequency 4 fsc, horizontal and vertical blanking pulses, a burst gate signal, and a clamping signal. The horizontal and vertical drive signals HD and VD and the sampling clock signal of frequency 4 fsc are supplied to camera block 1.

The red R-Y and blue B-Y color difference signals from camera block 1 are supplied to an encoder 4, in which they are modulated in an orthogonal two-phase modulation fashion in response to the color subcarrier signal fsc supplied thereto from synchronizing signal generating circuit 2. Encoder 4 is also supplied with the vertical and horizontal blanking pulses $P_{BV}$, $P_{BH}$, the burst gate pulse $P_{BG}$, and the clamping pulse $P_{CL}$ from synchronizing signal generating circuit 2.

A luminance/chrominance Y/C mixing circuit 5 mixes the luminance signal Y from camera block 1 and the carrier chrominance signal C from encoder 4 to provide an NTSC composite video signal suitable for display on a standard video monitor. This NTSC composite video signal is supplied at a monitor output terminal $T_M$ through a switch SW, whose operation will be described hereinbelow.

A record signal processing circuit 6 is of the generally known kind and the circuit arrangement thereof need not be described fully because it is well-known. In record signal processing circuit system 6, the luminance signal Y and the red R-Y and blue B-Y color difference signals from camera block 1 are processed to produce an analog component video signal suitable for recording on a magnetic tape. To be more specific, the luminance signal Y is frequency modulated to provide an FM-modulated luminance signal Y-FM, and the red R-Y and blue B-Y color difference signals, shown respectively in FIGS. 2A 2C, are timebase compressed and time-division multiplexed to provide a combined color difference signal, as shown in FIG. 2B. The combined color difference signal shown in FIG. 2B is then further frequency modulated to provide a color signal C-FM. The luminance signal Y-FM and the color signal C-FM are recorded on a magnetic tape T by magnetic record heads $H_{R1}$ and $H_{R2}$, respectively.

In the video signal reproducing apparatus section shown within the one-dot chain line block B of FIG. 1, the video signals Y-FM and C-FM that were recorded on the magnetic tape T according to the analog component recording system are reproduced from the magnetic tape T by playback magnetic heads $H_{P1}$ and $H_{P2}$, respectively. The reproduced video signals Y-FM and C-FM are then respectively amplified by playback amplifiers 10A and 10B and respectively demodulated by FM-demodulators 11A and 11B to provide the luminance signal Y and the complex chrominance signal C, whose timebase has been compressed, as shown in FIG. 2B.

The timebase-compressed/time-division multiplexed chrominance signal C is timebase-expanded by a timebase expanding circuit 12 to provide the two color difference signals R-Y and B-Y. A synchronizing signal separating circuit 13 is provided to extract a synchronizing signal from the luminance signal Y, and a pulse generator circuit 14 generates the various kinds of video pulses, such as horizontal and vertical blanking pulses and the like, on the basis of the synchronizing signal supplied thereto from synchronizing signal separating circuit 13.

Similar to encoder 4 of the camera section A, a playback encoder 15 converts the red R-Y and blue B-Y color difference signals supplied thereto into a carrier chrominance signal that is fed to a luminance/chrominance Y/C mixing circuit 16. In Y/C mixing circuit 16, the incoming luminance signal Y from FM demodulator 11A and the carrier chrominance signal C from encoder 15 are mixed to provide a composite video signal, and this composite video signal is fed out through the switch SW to the monitor output terminal $T_M$. The switch SW is switched to a recording-side fixed contact REC when a cameraman takes a picture and to a playback-side fixed contact PB upon playback of recorded signals.

In the video tape recorder having a built-in camera constructed as described above, when in the recording or camera mode the camera section A and recording system are operated, whereas in the playback mode only the reproducing apparatus section B is operated.

Generally, the monitor output terminal $T_M$ is required to supply a composite video signal for NTSC playback or recording, so that the reproducing apparatus section B according to the analog component recording system must have its own encoder 15 for converting the component video signal to the composite video signal and must also have separate ones of the peripheral circuits related to the encoder.

Therefore, the built-in camera-type video tape recorder according to the analog component recording system must provide two encoders, one in the camera section and one in the reproducing apparatus section, which precludes a compact-sized apparatus and involves increased cost.

OBJECTS AND SUMMARY OF THE INVENTION

Accordingly, it is an object of the present invention to provide an improved video signal recording and reproducing apparatus having a built-in video camera, in which the aforenoted shortcomings and disadvantages inherent in previously proposed systems can be avoided.

It is another object of the present invention to provide a video signal recording and reproducing apparatus having a built-in video camera, in which the overall circuit arrangement can be simplified and the cost thereof can be decreased.

According to an aspect of the present invention, a video signal recording and reproducing apparatus having a camera is provided in which the video signal generated by the camera is applied to the recording apparatus in a component manner, so that a luminance component and a chrominance component are separately recorded on different tracks. This video signal recording and reproducing apparatus having a camera includes an encoder supplied with a component color signal for deriving a carrier chrominance signal, a first switching circuit for selectively providing a synchronizing signal generated by a reference synchronizing signal generator in a recording mode or a reproduced synchronizing signal in a reproducing mode to the encoder, a second switching circuit for selectively providing the component color signal generated by the camera in a recording mode or a component color signal reproduced by the apparatus in a reproducing mode, and a mixing circuit for mixing the carrier chrominance signal and the luminance signal so as to generate a composite video signal that is supplied to an output terminal for monitoring.

According to another aspect of the present invention, a system having both a video camera and a recording and reproducing apparatus is comprised of a device for generating a luminance video signal and a component color video signal, a device for recording the luminance video signal and the component color video signal in different tracks on a magnetic tape, and a device for generating a reference synchronizing signal in a recording mode and a reproducing synchronizing signal in a reproducing mode. A switching circuit receives the component color video signal at one input and the reproduced component color video signal at another input, and further receives the reference and reproducing synchronizing signals for selectively supplying one of the component color video signals and one of the synchronizing signals to a single encoder in response to a mode signal indicating either the recording or reproducing mode. The switching circuit further consists of a switching circuit for selectively outputting one of the luminance signal or reproduced luminance video signals in response to the mode signal. A device for combining one of the component color video signals and one of the luminance video signals so as to generate a composite color video signal for monitoring is further provided.

In accordance with a third aspect of the present invention, a video camera and a recording and reproducing device are provided in a single unit for recording a color video signal generated by the video camera on a magnetic record medium in a component manner such that video luminance and chrominance signals are recorded in different tracks on the magnetic record medium and for reproducing the recorded luminance and chrominance signals from the magnetic record medium. The unit is comprised of a mixing circuit for generating a composite color video signal for output, and an encoder for receiving the chrominance and reproduced chrominance signals and selectively providing to the mixing circuit one or the other of the chrominance signals in response to a mode control signal, wherein the mixing circuit combines an output signal of the encoder and one of the luminance and reproduced luminance signals so that the composite video signal is generated for monitoring on a standard video monitor.

The above and other objects, features, and advantages of the present invention will become apparent from the following detailed description of preferred embodiments to be read in conjunction with the accompanying drawings, in which like reference numerals represent the same or similar elements in the several views.

DETAILED DESCRIPTION OF THE PREFERRED EMBODIMENTS

Figure 1:
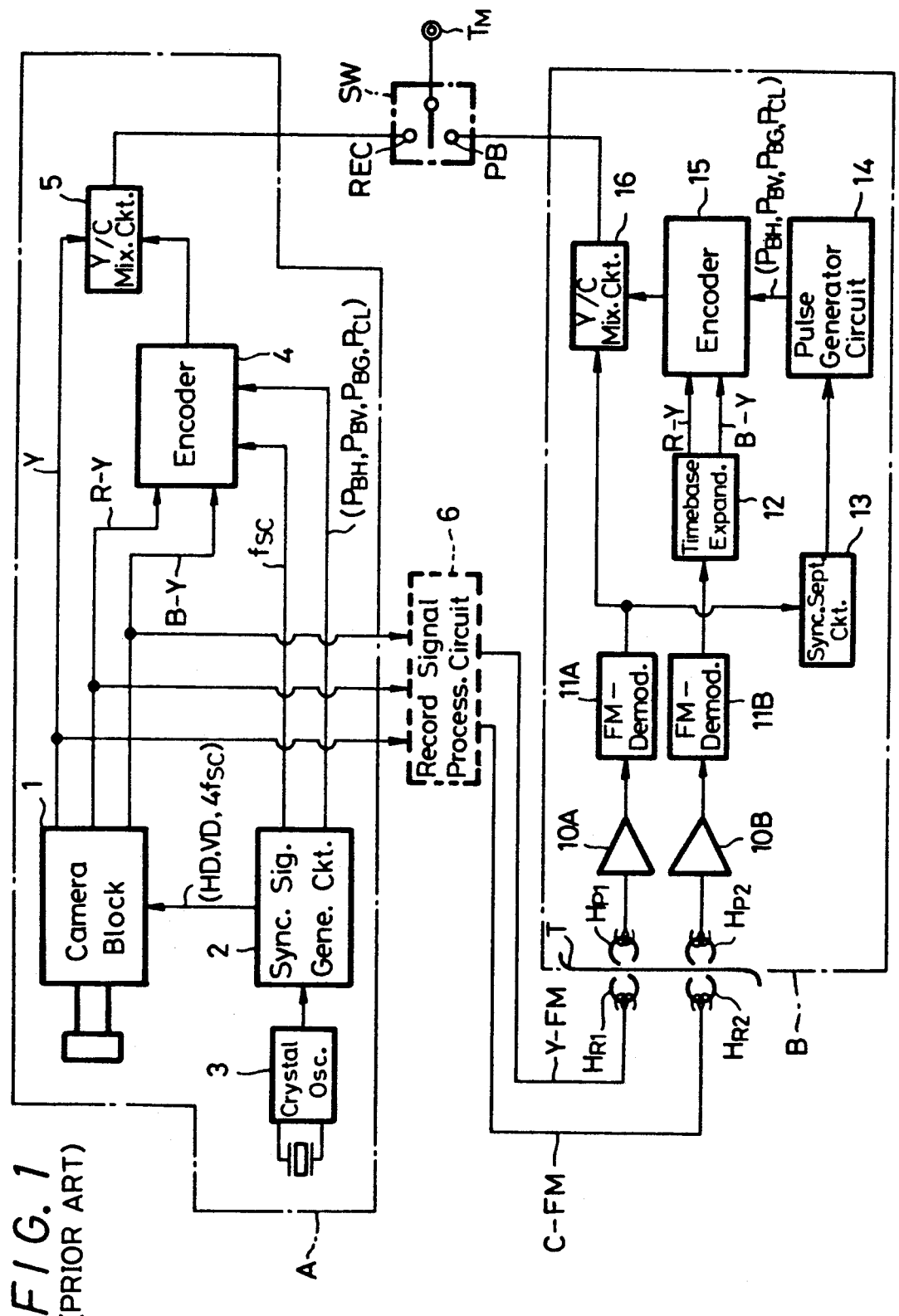
FIG. 1 is a block diagram of an example of a previously proposed video tape recorder having a built-in camera.
Figure 2:
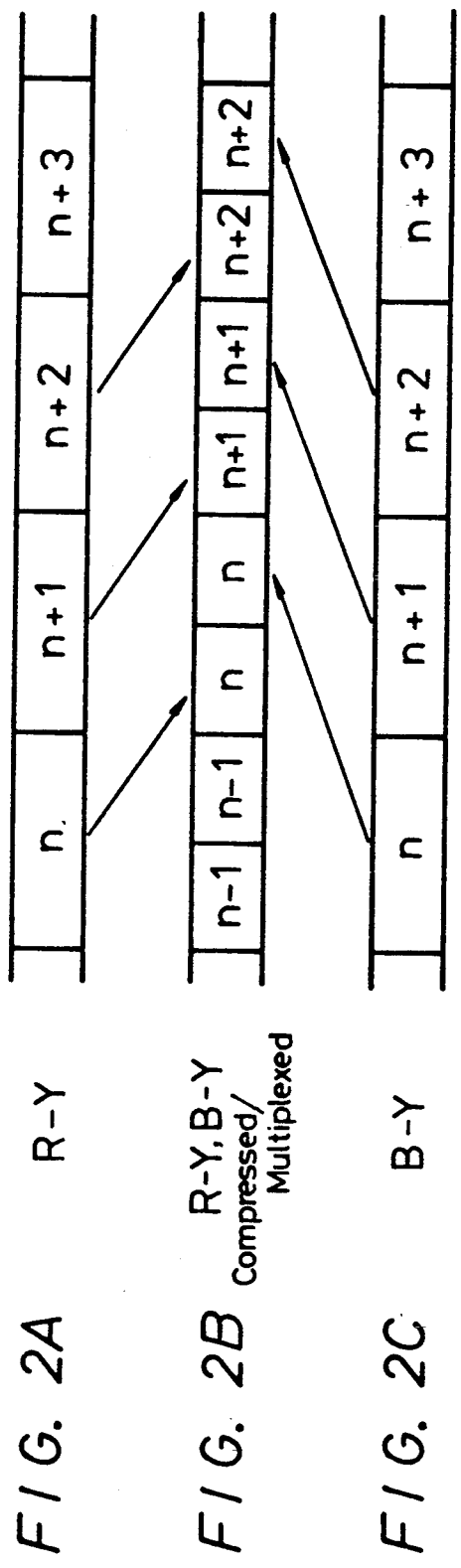
FIGS. 2A, 2B, and 2C are timing charts of color difference signals useful in explaining the operation of the video tape recorder having a built-in camera shown in FIG. 1.
Figure 3:
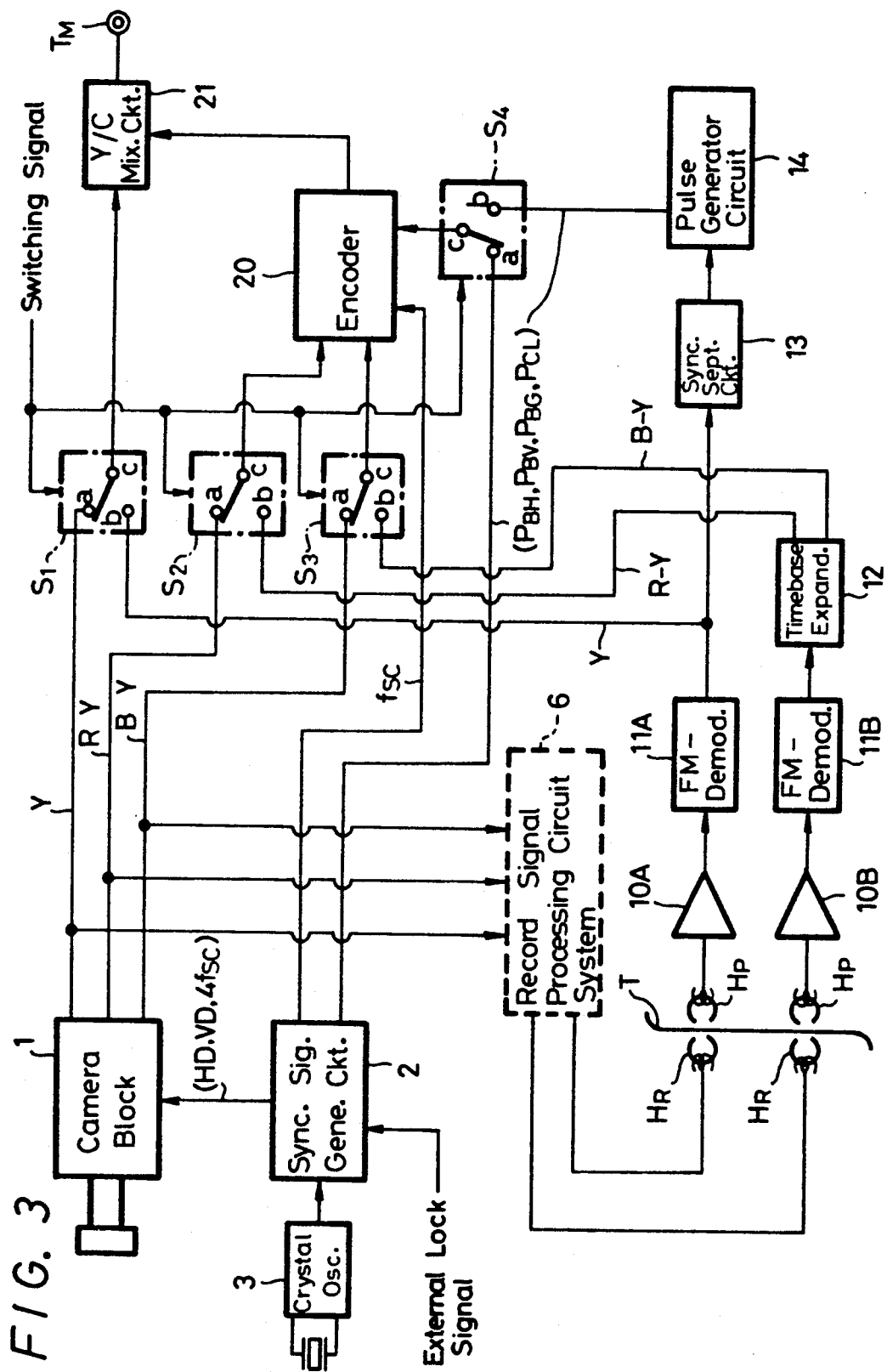
FIG. 3 is a block diagram of a video tape recorder having a built-in camera according to an embodiment of the present invention.

In the system of FIG. 3 an encoder 20 modulates the color difference signals R-Y and B-Y by the color subcarrier fsc to provide a carrier chrominance signal. This carrier chrominance signal is fed to a luminance/chrominance Y/C mixing circuit 21.

Switch circuits $S_1$ to $S_4$ are provided, and each of the switch circuits $S_1$ to $S_4$ is responsive to a switching signal to selectively connect its movable contact c to a connection terminal a in the camera mode or to a connection terminal b in the playback mode.

In the camera mode, the movable contacts of the switching circuits $S_1$ to $S_4$ are connected to the respective fixed terminals whereby the luminance signal Y from camera block 1 is supplied through switch $S_1$ to Y/C mixing circuit 21 and the red R-Y and blue B-Y color difference signals are respectively supplied through the switch circuits $S_2$ and $S_3$ to encoder 20. Further, the color subcarrier fsc from synchronizing signal generator circuit 2 is again supplied directly to encoder 20, and the vertical and horizontal blanking pulses $P_{BV}$, $P_{BH}$, the burst gate pulse $P_{BG}$, and the clamping pulse $P_{CL}$, which are synchronized with an external lock signal, are supplied through switch circuit $S_4$ to encoder 20. The signal converted into the carrier chrominance signal by encoder 20 is mixed with the luminance signal Y in Y/C mixing circuit 21, and the mixed signal is then fed to the monitor output terminal $T_M$ as the composite video signal.

The external lock signal is a reference synchronous signal generated by a reference signal generator (not shown). This reference signal generator may be set up at a broadcasting studio, in which case the external lock signal would be called a studio reference signal or a studio reference synchronous signal. As another example, if a master clock generator is used for a plurality of cameras or VTRS used outdoors, such as at a baseball game, for synchronous use, the external lock signal is referred to merely as a reference signal or external signal.

In the playback mode, the movable contacts c of switch circuits $S_1$ to $S_4$ are all connected to the playback terminals b, whereby the FM-demodulated luminance signal Y from FM-demodulator 11A is supplied through the switch circuit $S_1$ to Y/C mixing circuit 21. The red R-Y and blue B-Y color difference signals, which are derived from FM-demodulator 11B and timebase-expanded to their original timebases by timebase expanding circuit 12, are respectively supplied through the switch circuits $S_2$ and $S_3$ to encoder 20, wherein they are modulated on the basis of the color subcarrier fsc supplied thereto from synchronizing signal generator circuit 2 and output as the carrier chrominance signal. The vertical and horizontal blanking pulses $P_{BV}$, $P_{BH}$, the burst gate pulse $P_{BG}$, and the clamping pulse $P_{CL}$ are formed by pulse generator circuit 14 from the reproduced synchronizing signal from synchronizing signal separating circuit 13. Pulse generator circuit 14 may be comprised of a monostable multivibrator or the like and its output fed through the switch circuit $S_4$ to encoder 20, so that even when the reproduced synchronizing signals have an unstable time base, these pulses $P_{BV}$, $P_{BH}$, $P_{BG}$ and $P_{CL}$ are synchronized with the reproduced synchronizing signals.

The chrominance signal C output from encoder 20 is mixed with the luminance signal Y in Y/C mixing circuit 21 to provide the composite video signal similar to that produced in the camera mode, and this composite video signal is fed to the output terminal $T_M$.

The video tape recorder having a built-in camera of the present invention is constructed as described above, so that only one encoder is required, which provides a simplified circuit arrangement and a decreased cost as compared with the previously proposed circuit arrangement requiring two separate encoders.

In the foregoing, the switching circuits $S_1$ to $S_4$ are switched between terminals a or b in response to the switching control signal. This switching control signal need not be described in detail to understand the aforenoted embodiment and may be supplied to the switching circuits $S_1$ to $S_4$ at the time when the operation mode, either the camera mode or the playback mode, of the video tape recorder having a built-in camera is selected by the user.

Figure 4:
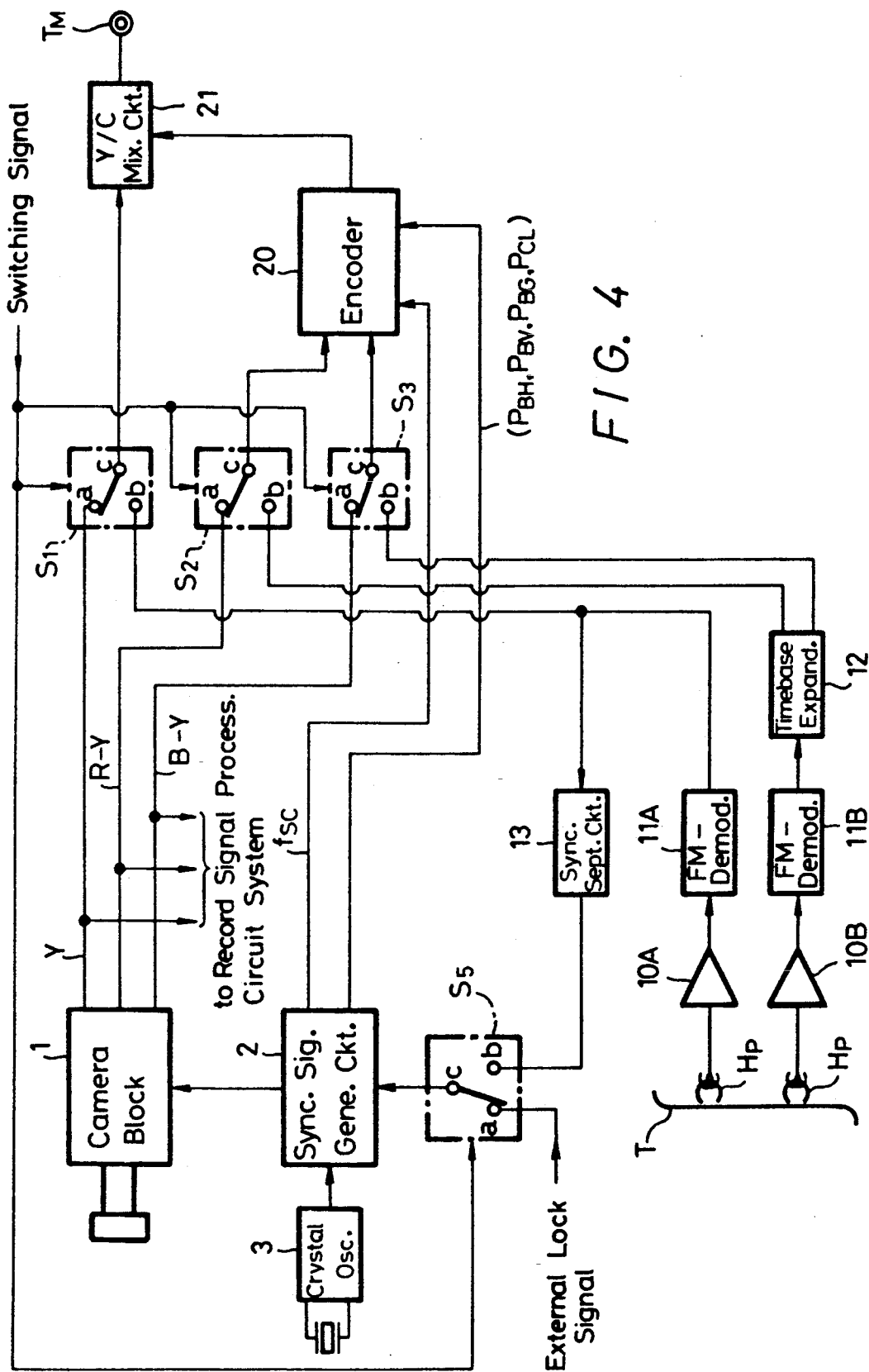
FIG. 4 is a block diagram of a video tape recorder having a built-in camera according to another embodiment of the present invention.

FIG. 4 shows a video tape recorder having a built-in camera according to another embodiment of the present invention, in which like parts corresponding to those of the embodiment of FIG. 3 are marked with the same reference numerals and therefore need not be described in detail, also the recording system is not shown in FIG. 4.

In the embodiment of FIG. 4, a switch $S_5$ whose connection terminals and b are selectively switched similarly to the switch circuits $S_1$ to $S_3$ provides in the camera mode the external lock signal, which was explained hereinabove, as the reference synchronizing signal to synchronizing signal generating circuit 2, while in the playback mode, the reproduced synchronizing signal separated by synchronizing separating circuit 13 is supplied to synchronizing signal generating circuit 2.

In operation of the circuit arrangement shown in FIG. 4, the vertical and horizontal blanking pulses $P_{BV}$, $P_{BH}$, the burst gate pulse $P_{BG}$, and the clamping pulse $P_{CL}$ derived from synchronizing signal generating circuit 2 are locked by the reproduced synchronizing signal from sync signal separating circuit 13 in the playback mode, so that even when the reproduced synchronizing signals are unstable the above-noted pulses $P_{BV}$, $P_{BH}$, $P_{BG}$, and $P_{CL}$ are all synchronized with the reproduced signals. This provides a substantial advantage in that pulse generating circuit 14 used in the embodiment shown in FIG. 3 may be eliminated. Nevertheless, in the playback mode the output of crystal oscillator 3 must be directly employed as the color subcarrier signal fsc by which the encode axis of encoder 20 is determined.

According to the embodiment shown in FIG. 4, as compared with the embodiment shown in FIG. 3, the pulse generating circuit 14 may be eliminated, which can provide a more simplified circuit arrangement.

As set out above, according to the video signal recording and/or reproducing apparatus having a built-in camera of the present invention, the color difference signals are supplied to the encoder from the camera section and the reproducing apparatus section via the switching array, which is changed in position depending on whether the camera mode or the playback mode is selected, whereby the encoder and the peripheral circuit sections therefor can be utilized commonly among the camera section and the playback section. Therefore, the circuit arrangement of this invention can be considerably simplified, which provides a compact-sized video signal recording and reproducing apparatus having a built-in camera with an overall decrease in cost.

Although preferred embodiments of the invention have been described in detail hereinabove with reference to the accompanying drawings, it is to be understood that the invention is not limited to those precise embodiments and that various changes and modifications could be effected by one skilled in the art without departing from the spirit or scope of the novel concepts of the invention, which is to be determined only by the appended claims.

What is claimed is:

1. A circuit for producing a composite video signal in a video signal recording and reproducing apparatus having a video camera operable in a recording mode and in a reproducing mode, in which a color video signal generated by the camera is applied to the recording and reproducing apparatus as component signals, so that a luminance component and a chrominance component are recorded on different tracks by the recording and reproducing apparatus and reproduced from different tracks by the recording and reproducing apparatus, the circuit comprising:

an encoder receiving chrominance component signals for producing therefrom a carrier chrominance signal a reference synchronizing signal generator;

a synchronizing signal separating circuit for separating a synchronizing signal from a reproduced luminance component signal;

a first switching circuit for selectively providing to said encoder a synchronizing signal generated by said reference synchronizing signal generator in a recording mode or a reproduced synchronizing signal from said synchronizing signal separating circuit in a reproducing mode;

a second switching circuit for selectively providing to said encoder the component chrominance signal generated by the camera in a recording mode and the component chrominance signal reproduced by the apparatus in a reproducing mode; and a mixing circuit for mixing the carrier chrominance signal and the luminance component signal and generating a composite video signal fed to an output terminal.

2. The circuit according to claim 1, in which said component chrominance signal comprises a R-Y color difference signal and a B-Y color difference signal.

3. The circuit according to claim 2, in which said reference synchronizing signal generator includes a crystal oscillator and a synchronizing signal generating circuit connected to said crystal oscillator.

4. The circuit according to claim 3, in which said reference synchronizing signal generator further includes a signal separating circuit for separating a reproduced synchronizing signal from the reproduced luminance component.

5. The circuit according to claim 1, further comprising a timebase expansion circuit for expanding a timebase of the reproduced chrominance component signal.

6. Apparatus for producing a composite color video signal in a video camera combined with a recording and reproducing apparatus employing a magnetic tape and being operable in a recording mode and a reproducing mode, comprising:

means included in said video camera for generating a luminance video signal and a component color video signal;

means for recording the luminance video signal and the component color video signal on different respective tracks formed on a magnetic tape;

means for reproducing the luminance video signal and the component color video signal from different respective tracks on a magnetic tracks;

means for generating a reference synchronizing signal in a recording mode and a reproducing synchronizing signal in a reproducing mode;

an encoder for producing a carrier chrominance signal;

switching means receiving the component color video signal from the video camera, the reproduced component color video signal from the means for reproducing, the reference synchronizing signal, and the reproducing synchronizing signal for selectively supplying one of the component color video signals and one of the synchronizing signals to the encoder in response to a mode signal indicating either the recording mode or the reproducing mode, said switching means further receiving a luminance video signal from the camera and a reproduced luminance video signal for selectively outputting one of the luminance video signal or reproduced luminance video signal in response to the mode signal; and means for combining a carrier chrominance signal and one of said luminance video signals output from said switching means and generating a composite color video signal for display on a video monitor.

7. The video camera according to claim 6, in which said component color video signal comprises R-Y and B-Y color difference signals.

8. The video camera according to claim 7, in which said means for generating a reference synchronizing signal includes a crystal oscillator and a synchronizing signal generating circuit connected to said crystal oscillator.

9. The video camera according to claim 8, in which said means for generating a reference synchronizing signal further includes a synchronizing separating circuit for separating a reproduced synchronizing signal from the reproduced luminance video signal.

10. The video camera according to claim 9, in which said means for reproducing includes a timebase expansion circuit for expanding a timebase of the reproduced component color video signal.

11. The video camera according to claim 10, in which said means for generating a reference synchronizing signal includes an input terminal for receiving an external synchronizing signal so as to synchronize said reference synchronizing signal with said external synchronizing signal.

12. Apparatus for producing a composite video signal from a video camera and a recording and reproducing device arranged in a single unit for recording a color video signal generated by said video camera on a magnetic record medium such that luminance and chrominance signals constituting the video signal are recorded on different respective tracks formed on said magnetic record medium and for reproducing luminance and chrominance signals recorded in different respective tracks from said magnetic record medium, the apparatus comprising a mixing circuit for generating a composite color video signal from a luminance signal and a chrominance signal fed thereto; and means for switching and encoding connected to receive the chrominance signal from the camera and a reproduced chrominance signal for selectively providing to said mixing circuit one of said chrominance signals in response to a mode signal, and connected to receive the luminance signal from said camera and a reproduced luminance signal from selectively providing to said mixing circuit one of said luminance signals in response to a mode signal, wherein said mixing circuit combines outputs of said means for switching and encoding so that said composite video signal is generated for monitoring on a video monitor.

* * * * *

UNITED STATES PATENT AND TRADEMARK OFFICE
CERTIFICATE OF CORRECTION

PATENT NO. : 5,153,743

DATED : October 6, 1992

INVENTOR(S) : Kenji Nakamura et al

It is certified that error appears in the above-identified patent and that said Letters Patent is hereby corrected as shown below:

Column 4, line 47, after "contacts" insert --c-- line 49, after "terminals" insert --a,--

Column 5, line 60, after "terminals" insert --a--

Column 8, line 41, after "comprising" insert --:--

Signed and Sealed this

Twenty-first Day of June, 1994

Attest:

BRUCE LEHMAN

*Attesting Officer*  *Commissioner of Patents and Trademarks*